United States Patent [19]

Hirose

[11] Patent Number: 5,010,837

[45] Date of Patent: Apr. 30, 1991

[54] FLOATING RACEWAY, FLOATING WATER STORAGE TANK, COMPOSITE FLOATING RACEWAY, MARINE PADDY FARMING DEVICE, FLOATING HYDROPONIC FARMING DEVICE, AND VESSEL

[76] Inventor: Tokuzo Hirose, 13-13, Higashiyamacho, Ashiya-shi, Hyogo-ken, Japan

[21] Appl. No.: 394,941

[22] Filed: Aug. 17, 1989

[30] Foreign Application Priority Data

Jun. 8, 1989 [JP] Japan .................................. 1-146438

[51] Int. Cl.$^5$ ............................................. B65D 88/78
[52] U.S. Cl. ........................................ 114/256; 47/59; 405/60
[58] Field of Search ................... 114/256, 74 R, 39.1; 47/59, 63, 64, 65; 405/60, 68

[56] References Cited

U.S. PATENT DOCUMENTS

| | | | |
|---|---|---|---|
| 3,230,967 | 1/1966 | Castro | 405/68 X |
| 3,324,821 | 6/1967 | Laughlin | 114/39.1 X |
| 3,730,120 | 5/1973 | Dobell | 114/256 |
| 4,037,360 | 7/1977 | Farnsworth | 47/63 |
| 4,290,229 | 9/1981 | Miura | 47/65 X |
| 4,735,524 | 4/1988 | Dunkers | 405/60 |

FOREIGN PATENT DOCUMENTS 0009942  1/1980  Japan .

*Primary Examiner*—Sherman Basinger
*Attorney, Agent, or Firm*—Wenderoth, Lind & Ponack

[57] ABSTRACT

A floating raceway includes a raceway portion formed of a tough and flexible film material to define a space for accommodating water, and a floating bank portion surrounding the raceway portion for imparting buoyancy to the raceway portion and shutting off the interior of the raceway portion from the exterior. Therefore, the raceway stays afloat on the water surface to allow water in the raceway portion to be transported. The raceway portion can be set afloat on the water by way of the floating bank portion. Therefore, it can be advantageously employed to transport water. By a similar arrangement it is possible to provide a floating water storage tank so that a large amount of water can be made available at sea.

2 Claims, 5 Drawing Sheets

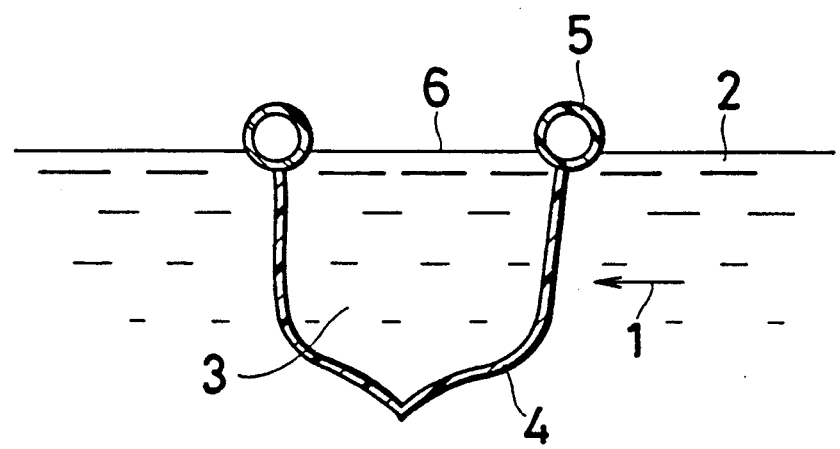
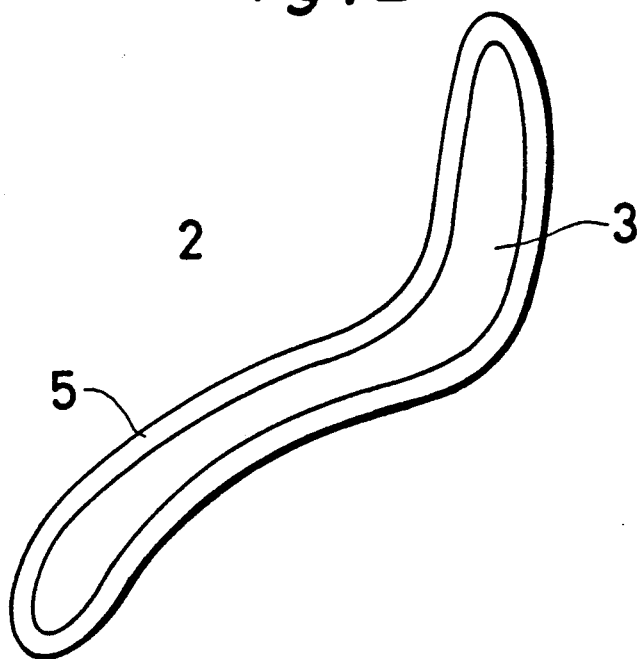

FLOATING RACEWAY, FLOATING WATER STORAGE TANK, COMPOSITE FLOATING RACEWAY, MARINE PADDY FARMING DEVICE, FLOATING HYDROPONIC FARMING DEVICE, AND VESSEL

BACKGROUND OF THE INVENTION

1. Field of the Invention

This invention relates to a floating raceway, a floating water storage tank, a composite floating raceway, a marine paddy farming device, a floating hydroponic farming device, and a vessel which can be used as such on the sea, lake, or the like surface.

2. Description of the Prior Art

In recent years, abnormal weather conditions have often been experienced throughout the world. For example, a long spell of drought has caused a considerable decrease in agricultural production in various parts of the world including the United States, Canada, China, and India, while various other regions have suffered from heavy rains and floods. In connection with such abnormal occurrences, great concern has been drawn to the problem of the so-called greenhouse effect of the atmosphere, and in industrially developed countries, great attention has been directed to various counter measures against the problem. Considerable parts of the continents are occupied by deserts, and it appears that the desert areas tend to expand. On the other hand, a larger part of the earth is occupied by vast areas of seas, and the surface of the seas is little utilized except for fishery, traffic, and leisure-oriented purposes. Thus, vast unexploited spaces exist in the sea areas.

The present inventor has, in the past, proposed an arrangement intended for utilization of water resources. As a concept which represents one step forward beyond the previous proposal, the present invention is directed toward solving the problem of supplying water from an area in which an abundant water supply is available to another area in which water is eagerly demanded, and not only in the context of the provision of a stationary arrangement for utilization of water resources. Of course, the invention is intended for effective utilization of such resources as well.

SUMMARY OF THE INVENTION

The object of the invention is to provide a floating raceway, a floating water storage tank, a composite floating raceway, a marine paddy farming device, a floating hydroponic farming device, and a vessel which are ideal for effective utilization of water resources by enabling water to be supplied from a region which is rich in water resources and also for effective utilization of an unexploited space, such as a seawater surface.

In accordance with the invention a floating raceway is provided which comprises a raceway portion formed of a tough and flexible film material to define a space for accommodating water, and a floating bank portion surrounding the raceway portion for imparting buoyancy to the raceway portion and shutting off the interior of the raceway portion from the exterior, whereby the floating raceway can stay afloat on a water surface so that water in the raceway portion can be transported.

In the floating raceway according to the invention, a top surface of the raceway portion is covered with a flexible film layer.

In accordance with the invention a floating water storage tank is also provided which comprises a raceway portion formed of a tough and flexible film material to define a space for conducting water, and a floating bank portion surrounding the raceway portion for imparting buoyancy to the raceway portion and shutting off the interior of the raceway portion from the exterior, whereby the floating water storage tank is configured into a boat shape for ease of movement on a water surface when it is set afloat on the water surface and when the raceway portion is filled with water.

In the floating water storage tank according to the invention, a top surface of the raceway portion is covered with a flexible film layer.

In accordance with the invention a composite floating raceway is also provided which comprises a pair of raceways, each of the raceways having a raceway portion formed of a tough and flexible film material to define a space for accommodating water, and a floating bank portion surrounding the raceway portion for imparting buoyancy to the raceway portion and shutting off the interior of the raceway portion from the exterior, the raceways being floatable on a water surface, and a communicating raceway formed of a flexible material which interconnects the pair of raceways and runs under the water surface.

In accordance with the invention a marine paddy farming device is also provided which comprises a raceway portion formed of a tough and flexible film material to define a space for conducting water, and a floating bank portion surrounding the raceway portion for imparting buoyancy to the raceway portion and shutting off the interior of the raceway portion from the exterior, whereby the paddy farming device is configured into a boat shape for ease of movement on a water surface when it is set afloat on the water surface and when the raceway portion is filled with water, and whereby paddy rice plants can be cultivated at a level adjacent an upper portion of the raceway portion.

In accordance with the invention a floating hydroponic farming device is also provided which comprises a raceway portion formed of a tough and flexible film material to define a space for accommodating water, and a floating bank portion surrounding the raceway portion for imparting buoyancy to the raceway portion and shutting off the interior of the raceway portion from the exterior, whereby the paddy farming device is configured into a boat shape for ease of movement on a water surface when it is set afloat on the water surface and when water is accommodated in the raceway portion, and a floating support for supporting plants growing afloat on the water surface of the raceway portion.

Further, in accordance with the invention a vessel is provided which comprises a raceway portion formed of a tough and flexible film material to define a space for accommodating water, and a floating bank portion surrounding the raceway portion for imparting buoyancy to the raceway portion and shutting off the interior of the raceway portion from the exterior, whereby the vessel is configured into a boat shape for ease of movement on a water surface when it is set afloat on the water surface and when the raceway portion is filled with water, and the vessel further comprising an upper surface of the raceway portion being covered with a buoyant material.

The vessel according to the invention further comprises propulsion mean including a propeller and a motor for driving the propeller, and/or a sail.

In the floating raceway according to the invention, the raceway portion thereof is formed of a tough and flexible film material defining a space for accommodating water. This raceway portion can be set afloat on a water surface by means of the floating bank portion. Therefore, the floating raceway of the invention can be employed to transport water. By a similar arrangement it is possible to provide a floating water storage tank which enables a large amount of water to be stored at a location at sea.

According to another aspect of the invention, a composite floating raceway comprises a pair of raceways interconnected by a communicating raceway formed of a flexible material and running therebetween under a seawater surface such that a boat can pass between the pair of raceways. Therefore, the invention cannot possibly interfere with marine traffic.

Further, according to the invention, it is possible to provide a marine paddy field or a marine hydroponic farm. Additionally, a vessel and also a sailboat equipped with propulsion means can be provided.

As above noted, according to the invention, unexploited vast sea areas can be advantageously utilized for agricultural and fishery purposes. Further, the invention makes it possible to convert a desert area into arable land. In addition, the invention is useful for purposes of protecting the earth's environment. The floating raceway and floating water storage tank according to the invention can be industrially mass produced. Moreover, they are formed mainly of a film material and can be economically manufactured. The material used in this manufacture can be repeatedly utilized. The device of the invention can also be conveniently set up at a ground site.

BRIEF DESCRIPTION OF THE DRAWINGS

The above and other objects, features, and advantages of the invention will become more apparent from the following detailed description taken in conjunction with the accompanying drawings.

FIG. 1 is a sectional view of one embodiment of the invention;

FIG. 2 is a plan view of the embodiment shown in FIG. 1;

DETAILED DESCRIPTION OF THE PREFERRED EMBODIMENTS

Figure 3:
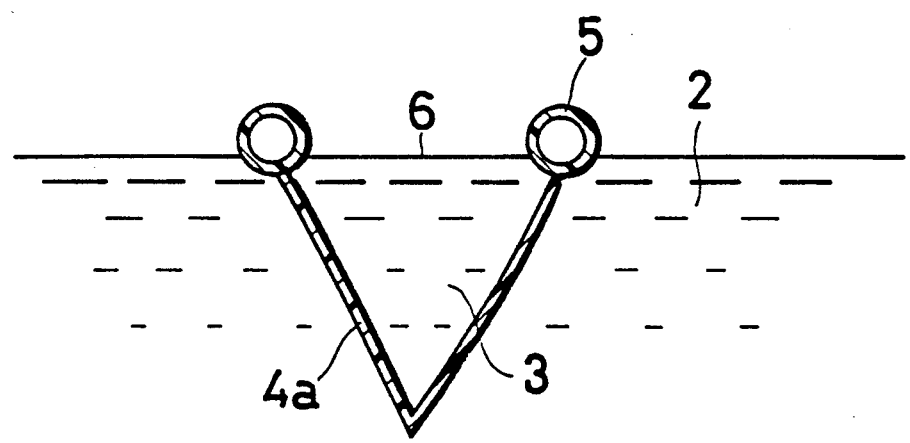
FIG. 3 is a sectional view of another embodiment of the invention.

Preferred embodiments of the invention will now be described in detail with reference to the drawings.

FIG. 1 is a sectional view showing one embodiment of the invention, and FIG. 2 is a plan view thereof. A floating raceway 1 is shown afloat at a sea site 2. The floating raceway 1 is formed of a tough and flexible film material and has a raceway portion 4 defining a space for accommodating water 3 such as fresh water. Provided around an upper portion of the raceway portion 4 is a floating bank portion 5 which imparts buoyancy to the raceway portion 4 and shuts off the interior of the raceway portion 4 from the exterior or sea water. Thus, the floating raceway 1 stays afloat on the water surface so that water 3 is allowed to flow in the raceway portion 4. The film material of which the raceway portion 4 is formed is a flexible and tough composite laminar material made of synthetic resin, leather, fibers, or a non-woven fabric. Synthetic resins useful for this purpose include, in addition to those in the form of a film or sheet, fiber reinforced plastics, expanded plastics, water-containing plastics, synthetic rubber, coating materials, greasy plastics, and composite reinforced plastics.

The floating bank portion 5 may be formed of a material which can impart buoyancy to the raceway portion 4, and it may be, for example, in the form of an elongate hollow bag.

As is apparent from FIG. 1, the raceway 1 can be configured to have a boat-like shape so that it is easily movable on the water surface when the raceway portion 4 is filled with water, and accordingly, it is possible to provide a floating water storage tank. The raceway portion 4 may be closed by covering its top portion with a flexible film material 6, or may be left open at the top without using such a film material.

Figure 4:
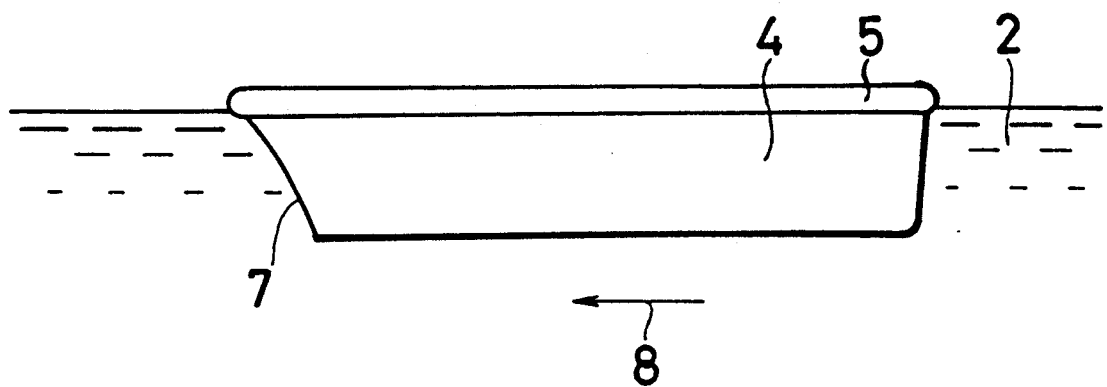
FIG. 4 is a side view of another embodiment of the invention.
Figure 5:
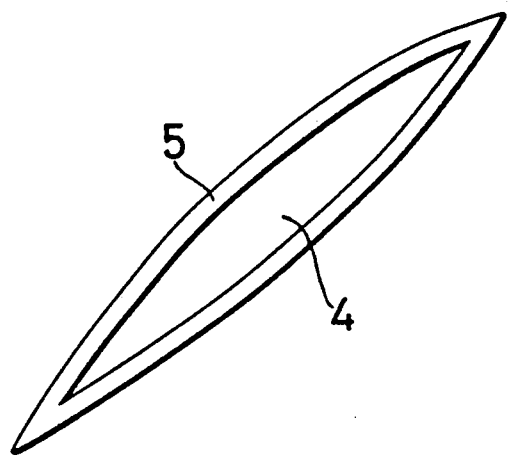
FIG. 5 is a plan view of another embodiment of the invention.

FIG. 3 is a sectional view showing another embodiment of the invention. A raceway portion 4a has a V-shaped cross section in this embodiment. When the raceway portion 4 is configured into a boat-like shape as shown in FIG. 1 or 3, its side elevation ma be configured as shown in FIG. 4 for ease of movement on the water surface, with a front end portion 7 taken as a head portion of the boat in the direction of its forward movement 8. In the case of the raceway portion being configured as such, as FIG. 5 shows, it extends in an elongate straightforward pattern along the direction of its movement 5, it being thus smoothly movable.

According to such arrangement, (a) it is possible to collect fresh water from a river for processing; (b) it is possible to transport the collected water to an area requiring a supply of such water; and (c) it is possible to utilize the obtained supply of fresh water in an area in which it is demanded.

For example, in Japan, it is possible to transport a supply of water obtained form the River Yoshino to Kagawa for utilization of the same for irrigation purposes. Likewise, a supply of water collected from the Nile can be transported to a western region of Africa or to Arabia for irrigation purposes. Likewise again, it is possible to provide a supply of fresh water on a salt lake in the Caspian Sea or the Aral Sea and utilize the same for irrigation of a peripheral area.

Figure 6:
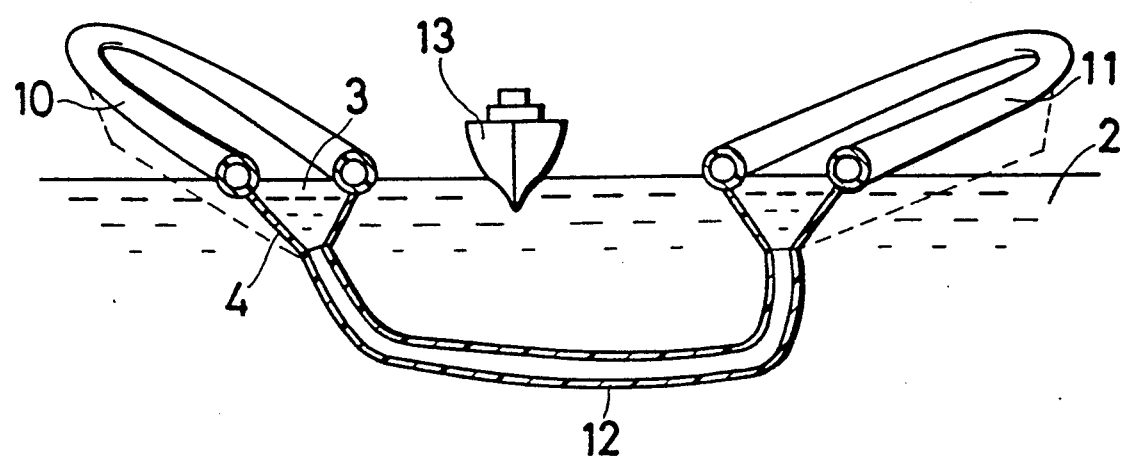
FIG. 6 is a perspective view, partly in section, of a further embodiment of the invention.
Figure 7:
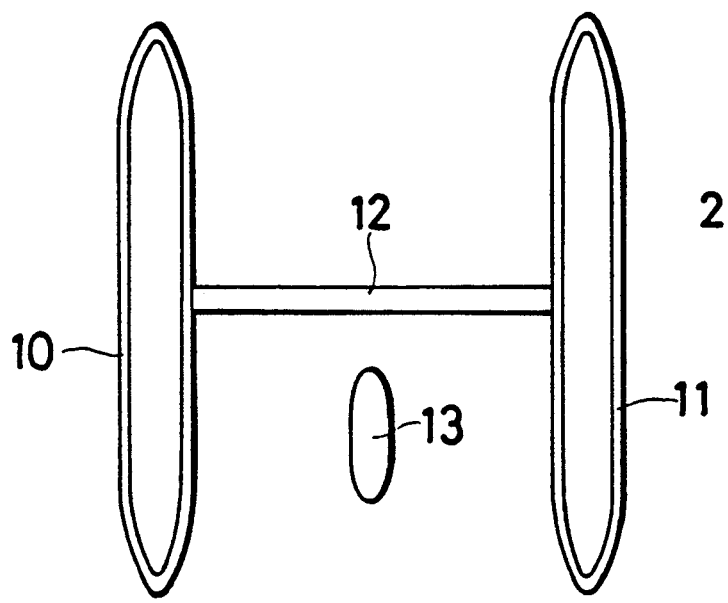
FIG. 7 is a schematic plan view of the embodiment shown in FIG. 6.

FIG. 6 is a sectional view showing another embodiment of the invention, and FIG. 7 is a plan view of same. In this embodiment, there are provided a pair of floating raceways 10, 11 which are of an arrangement similar to that of the earlier described raceway 1. The bottom portions of the raceways 10, 11, are in communication with and are interconnected by an elongate communicating raceway 12. The communicating raceway 12 is formed of a flexible material and runs under the surface of the sea. In this way a composite floating raceway can be constructed such that a ship 13 or the like may travel between the pair of raceways 10, 11 which are of a considerably large size and above the communicating raceway 12, whereby it is possible to prevent the floating raceway from interferring with marine traffic.

Figure 8:
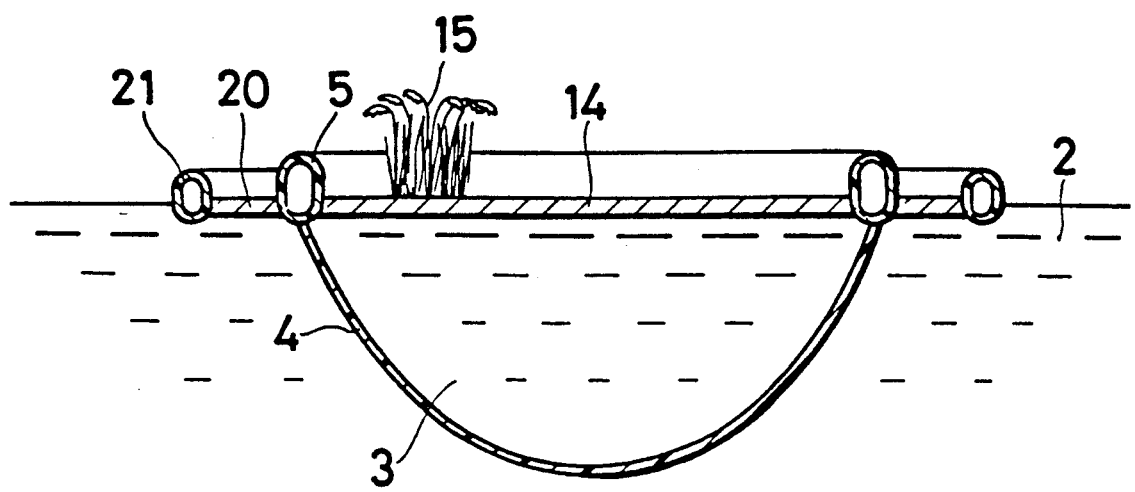
FIG. 8 is a sectional view of another embodiment of the invention.

Furthermore, it is possible to grow paddy rice plants on upper portions of the raceways 10, 11. For this purpose, a buoyant support is provided for enabling the paddy rice plants to stay afloat. FIG. 8 schematically shows paddy rice plants 15 being grown by using such a buoyant support 14.

It is also possible to provide a floating hydroponic farm by supporting plants on the buoyant support 14. In this case, water 3 in the raceway portion 4 should comprise fresh water and nutrients whereby hydroponic farming can be carried out for growing aquatic plants or paddy rice plants. In another form of the invention, fresh water 3 is contained in a floating water storage tank so that water hyacinth, an aquatic plant, may be grown therein in such large amounts that masses of such plant cover the surface of sea sites on, for example, the Pacific or Atlantic Ocean, so that they absorb large amounts of carbonic acid gas, a substance known now as a source of the so-called greenhouse effect. Since such a plant acts to purify contaminated water, it is well possible to utilize water 3 as purified water.

Further it is possible to use the raceway portion 4 as a water storage tank, with fresh water or sea water contained therein, on a salt lake which cannot usually be utilized for any practical purpose, whereby the cultivation of fish can be carried out in the water storage tank.

Figure 9:
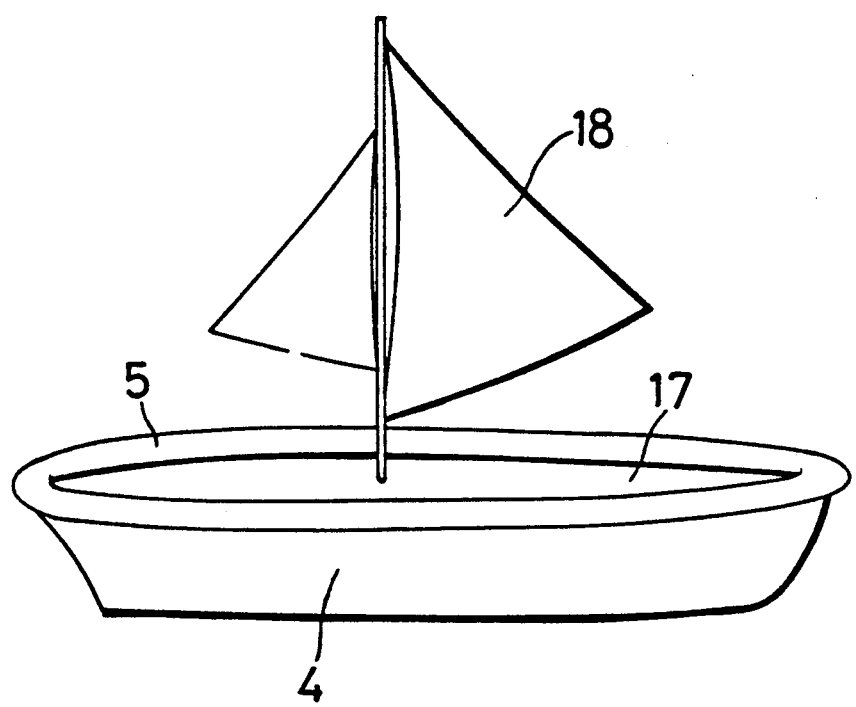
FIG. 9 is a perspective view showing still another embodiment of the invention.

Additionally, as FIG. 9 shows, an upper portion of the raceway portion 4 may be covered with a buoyant material 17 so that it is employed as a boat. The boat can be utilized as a sail boat by equipping it with a propeller and a motor for driving the propeller to provide a propulsion force, or equipping it with a sail.

It is also possible as FIG. 8 shows, to provide a tough and flexible film or strainer membrane 20 on the entire outer periphery of the floating bank portion 5, and provide, on the outer periphery of the strainer membrane 20, another floating bank portion 21 which allows the strainer membrane 20 to stay afloat on the sea, whereby sea water is prevented from entering into the water 3 in the raceway portion 4.

This invention may be embodied in other specific forms without departing from the spirit or essential charactersitics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A composite floating raceway comprising:
   a pair of raceways, each of said raceways including a raceway portion formed of a trough-shaped tough and flexible film of material defining a space therein for accommodating water, and a floating bank portion extending along the periphery of said raceway portion,
   said floating bank portion imparting buoyancy to said raceway portion when the raceway portion is disposed in a body of water such that said trough-shaped raceway extends below the surface of the body of water while said floating bank portion floats thereon, and providing a barrier with respect to said space against a body of water when said raceway portion is disposed in the body of water with said floating bank portion floating on the surface of the body of water; and
   a communicating raceway formed of a tube of flexible material interconnecting said pair of raceways and communicating with the space defined in each said raceway portion, said tube of flexible material allowing said pair of raceways to be spaced apart from one another to in turn allow marine traffic to pass therebetween when said pair of raceways are disposed in a body of water.

2. A floating farming device comprising:
   a raceway portion formed of a trough-shaped tough and flexible film of material defining a space therein for accommodating water, said trough-shaped film forming sides of said raceway portion extending around said space at an upper part of the raceway portion;
   a floating bank portion extending along the periphery of said raceway portion at said upper part thereof, and imparting buoyancy to said raceway portion when the raceway portion is disposed in a body of water such that said trough-shaped raceway extends below the surface of the body of water while said floating bank portion floats thereon;
   a buoyant support around the entirety of which said floating bank portion extends, said buoyant support extending across said space from one side of said raceway portion toward the other side of said raceway portion so as to be floatable on freshwater occupying the space defined in said raceway portion, and said buoyant support being capable of supporting plants thereon; and
   a membrane extending radially outwardly from said floating bank portion and a second floating bank portion extending around said membrane and imparting buoyancy to said membrane, said membrane and said second floating bank portion providing a barrier with respect to said space against a body of water when said raceway portion is disposed in the body of water with said floating bank portion floating on the surface of the body of water.

* * * * *